(12) United States Patent
Naraharisetti et al.

(10) Patent No.: US 11,199,959 B2
(45) Date of Patent: *Dec. 14, 2021

(54) CONTROLLING AND MONITORING A SMOKE CONTROL SYSTEM

(71) Applicant: Honeywell International Inc., Charlotte, NC (US)

(72) Inventors: Kanaka Nagendra Prasad Naraharisetti, Bangalore (IN); Rajesh Babu Nalukurthy, Bangalore (IN); P Ranjith Kumar, Bangalore (IN); Rich Lau, Morris Plains, NJ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/067,068

(22) Filed: Oct. 9, 2020

(65) Prior Publication Data

US 2021/0026525 A1 Jan. 28, 2021

Related U.S. Application Data

(63) Continuation of application No. 16/245,068, filed on Jan. 10, 2019, now Pat. No. 10,802,696.

(51) Int. Cl.
*G06F 3/0484* (2013.01)
*G05B 15/02* (2006.01)

(52) U.S. Cl.
CPC ......... *G06F 3/04847* (2013.01); *G05B 15/02* (2013.01)

(58) Field of Classification Search
CPC .............................. G06F 3/04847; G05B 15/02

USPC .......................................................... 715/736
See application file for complete search history.

(56) References Cited

U.S. PATENT DOCUMENTS

| 10,482,901 | B1 * | 11/2019 | Maurer ................ G06N 3/0454 |
| 2010/0024992 | A1 | 2/2010 | Cloninger et al. |
| 2012/0158185 | A1 * | 6/2012 | El-Mankabady ........................... G06Q 10/0631 700/275 |

(Continued)

FOREIGN PATENT DOCUMENTS

| CN | 2090709 U | 12/1991 |
| CN | 2124743 U | 12/1992 |

(Continued)

*Primary Examiner* — William D Titcomb
(74) *Attorney, Agent, or Firm* — Brooks, Cameron & Huebsch, PLLC (57) ABSTRACT

Devices, systems, and methods for controlling and monitoring a smoke control system are described herein. One device includes a user interface that can be configured to receive a selection to perform a smoke control operation using a smoke control system of a facility and display a plurality of smoke control elements, wherein each respective one of the displayed smoke control elements represents a different component of the smoke control system used to perform the selected smoke control operation. The device can also include a memory and a processor configured to execute executable instructions stored in the memory to cause the selected smoke control operation to be performed by the component of the smoke control system, wherein the user interface is configured to display an operational state of the components represented by each respective one of the displayed smoke control elements during the performance of the selected smoke control operation.

20 Claims, 3 Drawing Sheets

(56) References Cited

U.S. PATENT DOCUMENTS

| | | | | |
|---|---|---|---|---|
| 2012/0260184 | A1* | 10/2012 | Dawes | G06F 3/0488 |
| | | | | 715/736 |
| 2014/0068486 | A1* | 3/2014 | Sellers | H04L 12/282 |
| | | | | 715/771 |
| 2015/0022346 | A1* | 1/2015 | Fadell | G05B 11/01 |
| | | | | 340/533 |
| 2016/0069584 | A1* | 3/2016 | Holaso | G05B 15/02 |
| | | | | 700/276 |
| 2016/0351043 | A1* | 12/2016 | Tabe | G08B 25/14 |
| 2017/0054571 | A1* | 2/2017 | Kitchen | H04L 12/4625 |
| 2017/0185278 | A1* | 6/2017 | Sundermeyer | G06F 3/0486 |
| 2017/0287298 | A1* | 10/2017 | Horon | G08B 19/005 |
| 2017/0300753 | A1* | 10/2017 | Billi | H04N 7/181 |
| 2018/0218540 | A1* | 8/2018 | Sridharan | G06T 7/251 |
| 2019/0258863 | A1* | 8/2019 | Billi | H04N 7/181 |

FOREIGN PATENT DOCUMENTS

| | | |
|---|---|---|
| CN | 1800740 A | 7/2006 |
| CN | 201018911 Y | 2/2008 |
| CN | 103674762 A | 3/2014 |
| CN | 104457852 A | 3/2015 |
| CN | 204745455 U | 11/2015 |
| CN | 205245265 U | 5/2016 |
| CN | 205245266 U | 5/2016 |
| CN | 106781219 A | 5/2017 |
| CN | 207025753 U | 2/2018 |
| CN | 108109326 A | 6/2018 |
| GB | 2112283 A | 7/1983 |
| WO | 2015200547 A1 | 12/2015 |

* cited by examiner

CONTROLLING AND MONITORING A SMOKE CONTROL SYSTEM

PRIORITY INFORMATION

This application is a Continuation of U.S. application Ser. No. 16/245,068, filed Jan. 10, 2019, the contents of which are incorporated herein by reference.

TECHNICAL FIELD

The present disclosure relates generally to systems, methods, and devices for controlling and monitoring a smoke control system.

BACKGROUND

Large facilities (e.g., buildings), such as commercial facilities, office buildings, hospitals, and the like, may have smoke control systems that can be used during an emergency situation (e.g., a fire) to manage the flow of smoke through the facility. For example, a smoke control system can include a number of components (e.g., equipment, sensors, operating panels, controllers, actuators, dampers, fans, etc.) located throughout the facility (e.g., on different floors of the facility) that can be used to perform smoke control operations, such as pressurizing, purging, exhausting, etc.

A smoke control system may also include a physical smoke control panel (e.g., box) installed in the facility that can be used by a user (e.g., operator) to directly control the operation of the components of the smoke control system. However, such a physical smoke control panel may require a large, complex amount of physical hardware and/or may occupy a large amount space in the facility, especially if the facility is a large facility that has many floors. Further, it can be difficult, costly, and/or time consuming to customize the physical smoke control panel to the particular needs of the facility and/or to make changes to the panel after it has been installed.

In some situations, it may be desirable for the smoke control system to perform complex operations that involve operation of multiple smoke control components. Verifying that such types of operations have been executed correctly and determining if the desired result has been achieved may involve checking states and status of various components involved in the operation. However, previous smoke control systems may not allow the user to identify what components are involved in an operation, determine the next component to be operated on in the sequence of operations, locate that component in the building layout or in the list of components, or determine whether that component has been activated or not.

Accordingly, previously used approaches may require an increased amount of time, resources, and space to control a smoke control system correctly. Previous approaches also typically require the user to be present at a physical control panel.

DETAILED DESCRIPTION

Systems, methods, and devices for controlling and monitoring a smoke control system are described herein. For example, an embodiment includes a user interface, a memory, and a processor. The user interface can be configured to receive a selection to perform a smoke control operation using a smoke control system of a facility and display a plurality of smoke control elements, wherein each respective one of the displayed smoke control elements represents a different component of the smoke control system used to perform the selected smoke control operation. The processor can be configured to execute executable instructions stored in the memory to cause the selected smoke control operation to be performed by the smoke control system. The user interface can also be configured to display an operational state of the components represented by each respective one of the displayed smoke control elements during the performance of the selected smoke control operation.

In contrast to previous smoke control systems in which a physical smoke control panel is installed in a facility to control the operation of the components (e.g., fans and/or dampers) of the smoke control system, smoke control systems in accordance with the present disclosure allow for the components of the smoke control system to be monitored and/or controlled using digital graphics (e.g., widgets) displayed to a user (e.g., operator) on a digital display (e.g., a computer screen). Accordingly, smoke control systems in accordance with the present disclosure may have significantly less physical hardware, and/or occupy a significantly less amount of space in the facility, than previous smoke control systems that utilize a physical control panel.

Embodiments of the present disclosure can allow users to perform complex smoke control operations involving multiple components of a smoke control system via a workstation. Such operations can be linked to graphics elements, which can be referred to herein as "logic elements" on a graphical user interface. The graphical user interface can be configured to provide users with live feedback concerning the operation states of the components involved. Through the user interface, users can view all types of possible operations to be performed by components of the smoke control system, initiate or terminate one or more of these operations, correct the system's behavior during unplanned situations, take control of the system through manual override, and identify the position of a fault in the sequence of operations. A physical location of the fault can also be determined on a graphical building schematic view. The graphical user interface can also provide users with a live view of the smoke flow of the complete building, allowing users to make informed decisions and take effective actions.

Embodiments of the present disclosure can also allow users to perform graphical testing by simulating system changes before updating them on site. Users can also configure smoke control operations, view them on the graphical work station, and test them through graphical simulation. Such simulation can be performed away from the physical location of the smoke control system.

As such, smoke control systems in accordance with the present disclosure can be easier, less costly, and/or less time consuming to install, customize, and/or change (e.g., update) than previous smoke control systems that utilize a physical control panel. Further, smoke control systems in accordance with the present disclosure can make it easier (e.g., more intuitive) for the user to monitor and/or control the components of the smoke control system and identify causes and locations of faults than previous approaches that utilize a physical control panel.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a", "an", or "a number of" something can refer to one or more such things, while "a plurality of" something can refer to more than one such things. For example, "a number of devices" can refer to one or more devices, while "a plurality of devices" can refer to more than one device.

Figure 1:
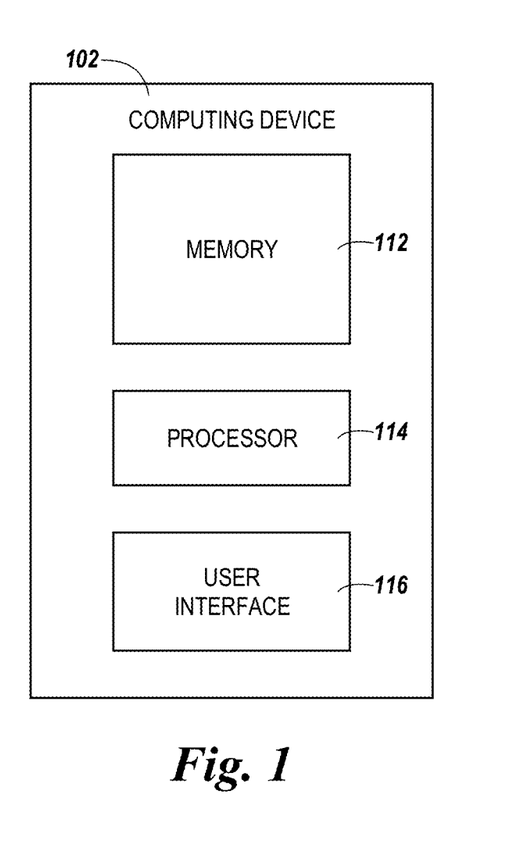
FIG. 1 illustrates an example of a computing device for controlling a smoke control system in accordance with an embodiment of the present disclosure.

FIG. 1 illustrates an example of a computing device 102 for controlling and monitoring a smoke control system in accordance with an embodiment of the present disclosure. The smoke control system can be the smoke control system of a facility (e.g., building). In some embodiments, the facility can be a facility with a large number of floors, such as a commercial facility, office building, hospital, and the like. However, embodiments of the present disclosure are not limited to a particular type of facility.

Computing device 102 can be, refer to, and/or include a laptop computer, desktop computer, or mobile device, such as, for instance, a smart phone or tablet, among other types of computing devices. However, embodiments of the present disclosure are not limited to a particular type of computing device. Computing device 102 may be located at the facility, such as, for instance, in a control room or operating room of the facility, or may be located remotely from the facility.

The smoke control system can be used during an emergency situation (e.g., a fire) to manage the flow of smoke through the facility. For example, the smoke control system may include a number of components, such as fans and/or dampers, located throughout the facility (e.g., on different floors of the facility) that can be used to perform smoke control operations, such as pressurizing, purging, exhausting, etc., in the facility. As used herein, controlling and monitoring the smoke control system can include and/or refer to monitoring and/or controlling the components (e.g., the operation of the components) of the smoke control system, as will be further described herein.

Computing device 102 can monitor and/or control the components of the smoke control system via a wired or wireless network. The network can be a network relationship through which computing device 102 can communicate with the components of the smoke control system. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from, and transmit information to, computing device 102 and the components of the smoke control system via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

As shown in FIG. 1, computing device 102 can include a processor 114 and a memory 112. Memory 112 can be any type of storage medium that can be accessed by processor 114 to perform various examples of the present disclosure. For example, memory 112 can be a non-transitory computer readable medium having computer readable instructions (e.g., computer program instructions) stored thereon that are executable by processor 114 to control a smoke control system in accordance with the present disclosure. That is, processor 114 can execute the executable instructions stored in memory 132 to control a smoke control system in accordance with the present disclosure.

Memory 112 can be volatile or nonvolatile memory. Memory 112 can also be removable (e.g., portable) memory, or non-removable (e.g., internal) memory. For example, memory 112 can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 112 is illustrated as being located in computing device 102, embodiments of the present disclosure are not so limited. For example, memory 112 can also be located internal to another computing resource (e.g., enabling computer readable instructions to be downloaded over the Internet or another wired or wireless connection).

As shown in FIG. 1, computing device 102 can include a user interface 116. A user (e.g., operator) of computing device 102, such as, for instance, an operator of the smoke control system, can interact with computing device 102 via user interface 116. For example, user interface 116 can provide (e.g., display) information to and/or receive information from (e.g., input by) the user of computing device 102.

In some embodiments, user interface 116 can be a graphical user interface (GUI) that can include a display (e.g., a screen) that can provide information to, and/or receive information from, the user of computing device 102. The display can be, for instance, a touch-screen (e.g., the GUI can include touch-screen capabilities). As an additional example, user interface 116 can include a keyboard and/or mouse the user can use to input information into computing device 102, and/or a speaker that can play audio to, and/or receive audio (e.g., voice input) from, the user. Embodiments of the present disclosure, however, are not limited to a particular type(s) of user interface.

As an example, user interface 116 can display a plurality of smoke control elements (e.g., widgets) with which the user of computing device 102 can interact (e.g., through direct manipulation). Each respective one of the displayed smoke control elements can represent a different component (e.g., a different damper or fan) of the smoke control system of the facility, and can include a plurality of actions that can be performed by (e.g., selected by the user to be performed by) the component represented by that smoke control element. For example, the actions included in a smoke control element that represents a damper of the smoke control system can include opening the damper, closing the damper, and operating the damper in auto mode. As an additional example, the actions included in a smoke control element that represents a fan of the smoke control system can include turning (e.g., switching) on the fan, turning off the fan, and operating the fan in auto mode.

In some embodiments, a control module connected to the component of the smoke control system represented by the element can cause a selected action to be performed. The control modules to be used in conjunction with each component of the system can be designated by the user, either manually or through the user interface 116.

Further, each respective one of the displayed smoke control elements can include an indication of the current operational state of the component represented by that smoke control element. For example, the indication of the current operational state included in a smoke control element that represents a damper of the smoke control system can be an indication of whether the damper is open or closed (e.g., the current operational state of the damper may be open or closed). Further, the indication of the current operational state included in a smoke control element that represents a fan of the smoke control system can be an indication of whether the fan is on or off (e.g., the operational state of the fan may be on or off).

The current operational states of a component represented by a smoke control element can be determined based on data received from a sensor. As described herein, the term "sensor" can refer to any device which can collect data. In some embodiments, the user can connect components of the smoke control system to the sensors to be used in determining their operational states. In some embodiments, this can be done through the user interface. In other embodiments, connections can be made manually.

Further, each respective one of the displayed smoke control elements can include a visual representation of the type of component represented by that smoke control element. For example, if the component represented by a smoke control element is a damper, that smoke control element can include a visual representation of a damper. Further, if the component represented by a smoke control element is a fan, that smoke control element can include a visual representation of a fan.

Further, each respective one of the displayed smoke control elements can include an indication of whether the component represented by that smoke control element is operating normally, or has a fault associated therewith (e.g., is faulty). Examples of smoke control elements that can be displayed on user interface 116 will be further described herein (e.g., in connection with FIGS. 2A and 2B).

In some embodiments, components of the smoke control system of the facility can be represented by a different respective smoke control element in the display, and the user interface 116 can continuously display the smoke control elements in a separate (e.g., the same) window in user interface 116, which can be designated as the smoke control screen. The user interface can also display a list of operational states of components of the smoke control system, which can be continuously updated as operational states are determined. Accordingly, all the components (e.g., smoke control elements representing each component) of the smoke control system of the facility and their operational states can be continuously visible to the user of computing device 102.

Via a logic element, the user interface 116 can receive a selection of a smoke control operation to be performed using the smoke control system of a facility. Such smoke control operations can be complex and involve many different actions to be taken by many different components. The actions can be performed by each component simultaneously, and/or can be performed in a pre-determined order as a sequence of actions. Specific smoke control operations (e.g., the actions or sequence of actions to be performed by the components of the smoke control system) can be configured by a user. Examples of smoke control operations to be performed can include, but are not limited to, exhausting, purging, and pressurizing.

The user interface 116 can display a number of logic elements, each corresponding to an available smoke control operation (e.g., representing a set of instructions for that smoke control operation). Through these elements, the user can select an operation to be performed. In some embodiments, the user can also select one or more locations (e.g. floors) of the smoke control facility on which the smoke control operation should be performed. Examples of elements that can be used to receive selections of smoke control operations to be performed will also be described herein (e.g., in connection with FIG. 3).

In some embodiments, the user interface 116 can receive a selection of a smoke control operation to be performed using the smoke control system and subsequently display each smoke control element representing each different component of the smoke control system used to perform the smoke control operation. In such embodiments, the display can allow the user to more clearly see which components are involved in the operation. Creating a display of smoke control elements based on components involved in a selected operation can also be beneficial in cases where the user interface 116 may not be large enough to display smoke control elements representing all of the components of the smoke control system.

The user interface 116 can also display a graphical animation of each displayed smoke control element corresponding to each component that is to perform an action during the performance of the selected smoke control operation. In some embodiments, the graphical animations can be based on operational states of each component that is to be involved in the operation, which can be determined before causing the operation to be performed. The graphical animation being performed by each smoke control element can change upon an action being performed by the component being represented by the smoke control element (e.g. upon a new operational state being determined as a result of the component represented by the smoke control element performing the action during the smoke control operation). As such, the graphical animation performed by the smoke control element before the component performs its action may be different than the graphical animation performed as a result of the component performing its action.

The memory 112 can store a set of instructions to be executed by the smoke control system for each smoke control operation that could be selected by a user. These instructions can include multiple actions to be taken by various components of the smoke control system.

As such, in some embodiments, the memory 112 can also store a set of classifications corresponding to a type of each of the components represented by smoke control elements displayed on user interface 116. The memory 112 can also store the location within the facility of each component represented. As such, an action to be taken by a component in accordance with a selected operation can be based on various factors, such as location and type. An example of a smoke control operation could be "Exhaust", which could include instructions to switch all of the dampers on a certain floor to "Open" and switch all of the fans on that floor to "On."

The memory 112 can also store a desired final operational state for each component or type of component involved in a smoke control operation. For example, the desired operational state of a damper located on a floor on which the "Exhaust" operation was performed could be "Open."

User interface 116 can receive, via one of the displayed smoke control operation elements, a selection of a smoke control operation to be performed using the smoke control system. The user can select the operation to be performed by, for example, using the mouse of the user interface to select "On" in that smoke control operation element in the display, or by touching the smoke control operation element in the display. A floor on which the operation is to be performed can also be selected by using the mouse or by touching a floor operation element displayed beneath the smoke control operation element.

Upon user interface 116 receiving the selection of the operation, computing device 102 can cause the actions involved in that operation to be performed by each of the corresponding components of the smoke control system, according to the instructions stored in the memory 112 for that operation. For example, computing device 102 can send (e.g., via the network previously described herein) an instruction (e.g., command) to each component to perform their corresponding actions, and each of the components can performed their assigned actions upon receipt of the instruction. The instruction can also be sent to each control module that has been connected to a component involved in the operation.

While the smoke control system is performing the selected operation, the user interface 116 can display a graphical animation of the displayed smoke control elements involved in the operation (e.g., to provide a visual confirmation to the user that the selected operation is being performed). For instance, the user interface 116 can perform graphical animations of the visual representations of each respective component involved in the operation upon that component performing its action. Each graphical animation can be based on the type of component represented and can correspond to the action performed by the component. In some embodiments, the graphical animations can be based on the operational states of the components represented.

In some embodiments, the graphical animations can be performed before the operation is performed (e.g., to provide a visual simulation of the operation to the user). Thus, the graphical animations can be performed, even if the operation is not performed. Such embodiments can provide the user with a graphical simulation of the operation without causing it to be performed.

In some embodiments, the graphical animations can be performed by a visual display of smoke control elements, wherein each of the smoke control elements represents all components of the smoke control system of a particular type and location. For example, one smoke control element can represent all of the fans on the first floor of a facility. If the operation that was selected involved turning on all of the fans on the first floor of the facility, the graphical animation of the element representing all of the fans on the first floor can show the visual representation of a fan turning off.

Further, user interface 116 can display an indication of whether any of the components of the smoke control system of the facility have a fault associated therewith (e.g., whether any of the components are faulty). For example, an element corresponding to a faulty component can include a white circle next to the word "Fault". An element corresponding to a faulty component could also be highlighted. Whether a component has a fault associated therewith can be determined by comparing the current operational state of that component to the desired state corresponding to the most recently performed operation or action.

Further, user interface 116 can display an indication of whether all the components of the smoke control system of the facility are operating in auto mode, or any of the components are being operated manually (e.g., being controlled by the user of computing device 102). In some embodiments, the user can also initiate a manual override through the user interface 116 if they wish to control components manually instead of through the user interface. In some embodiments, initiating a manual override can cause operations being performed to be terminated.

Figure 2A:
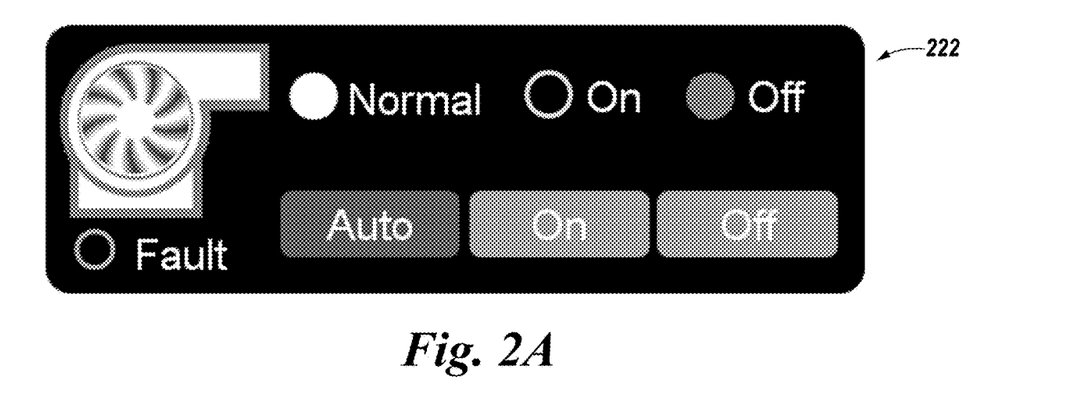
FIGS. 2A-2B illustrate examples of smoke control elements in accordance with an embodiment of the present disclosure.
Figure 2B:
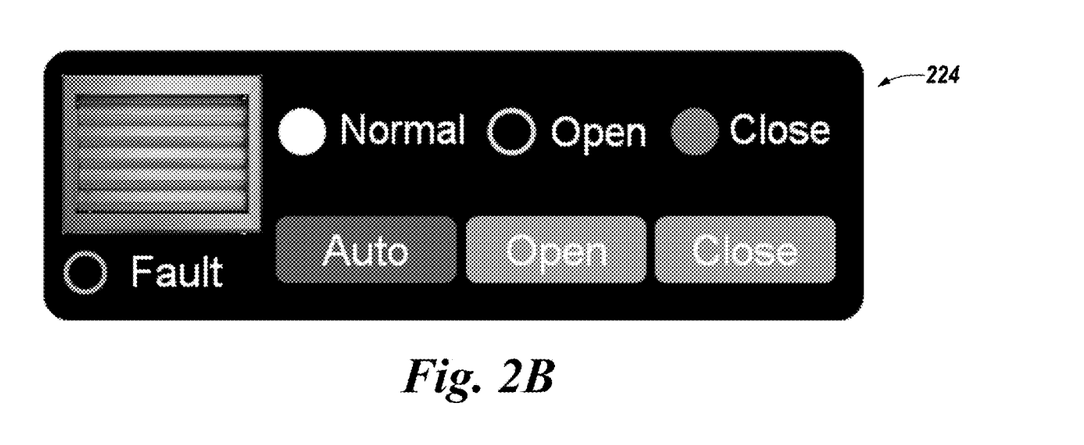

FIGS. 2A-2B illustrate examples of smoke control elements (e.g., widgets) in accordance with an embodiment of the present disclosure. For instance, FIG. 2A illustrates an example of a smoke control element 222 that represents a fan of a smoke control system of a facility, and FIG. 2B illustrates an example of a smoke control element 224 that represents a damper of a smoke control system of a facility. Smoke control elements 222 and 224 can be displayed on a user interface, such as, for instance, user interface 116 of computing device 102 previously described in connection with FIG. 1, and the smoke control system of the facility can be analogous to the smoke control system of the facility previously described in connection with FIG. 1.

As shown in FIGS. 2A and 2B, smoke control elements 222 and 224 each include three different actions that can be performed by the fan and damper, respectively, that they represent. For instance, smoke control element 222 includes the actions of turning (e.g., switching) on the fan (represented by the "On" icon at the bottom of the control element), turning off the fan (represented by the "Off" icon at the bottom of the control element), and operating the fan in auto mode (represented by the "Auto" icon at the bottom of the control element). Smoke control element 224 includes the actions of opening the damper (represented by the "Open" icon at the bottom of the control element), closing the damper (represented by the "Close" icon at the bottom of the control element), and operating the damper in auto mode (represented by the "Auto" icon at the bottom of the control element). In the examples illustrated in FIGS. 2A and 2B, the fan and damper, respectively, are operating in auto mode (represented by the illumination of the "Auto" icon in each respective control element).

Further, as shown in FIGS. 2A and 2B, smoke control elements 222 and 224 can include an indication of the current operational state of the fan and damper, respectively, that they represent. For instance, smoke control element 222 includes an indication that the current operational state of the fan is off (represented by the "Off" indicator at the top of the control element being illuminated, while the "On" indicator at the top of the control element is not illuminated), and smoke control element 224 includes an indication that the current operational state of the damper is closed (represented by the "Close" indicator at the top of the control element being illuminated, while the "Open" indicator at the top of the control element is not illuminated).

Upon the fan or damper performing an action, the indication of the current operational state of the fan or damper may change (e.g., update) based on the selected action (e.g., to correspond to the changed operational state of the component). For example, if the fan were to turn on, the "On" indicator of smoke control element 222 would be illuminated, and the "Off" indicator of smoke control element 222 would no longer be illuminated. If the damper were to open, the "Open" indicator of smoke control element 224 would be illuminated, and the "Close" indicator of smoke control element 224 would no longer be illuminated.

Further, as shown in FIGS. 2A and 2B, smoke control elements 222 and 224 can include a visual representation of the type of component of the smoke control system they represent. For example, smoke control element 222 includes a visual representation of a fan, and smoke control element 224 includes a visual representation of a damper.

Upon the fan or damper performing an action, a graphical animation of the visual representation of fan or damper included in smoke control element 222 or 224, respectively, may be displayed (e.g., performed). For example, if the fan were to turn on, smoke control element 222 may display a graphical animation of the visual representation of the fan turning on (e.g., turn on the visual representation of the fan included in the control element). If the damper were to open, smoke control element 224 may display a graphical animation of the visual representation of the damper opening (e.g., open the visual representation of the damper included in the control element).

Further, as shown in FIGS. 2A and 2B, smoke control elements 222 and 224 can include an indication of whether the fan and damper, respectively, that they represent is operating normally, or has a fault associated therewith. For instance, smoke control elements 222 and 224 includes an indication that the the fan and damper, respectively are operating normally (represented by the "Normal" indicator being illuminated, while the "Fault" indicator is not illuminated). If the fan or damper were to have a fault associated therewith (e.g., be faulty), the "Fault" indicator in smoke control element 222 or 224, respectively, would be illuminated.

Figure 3:
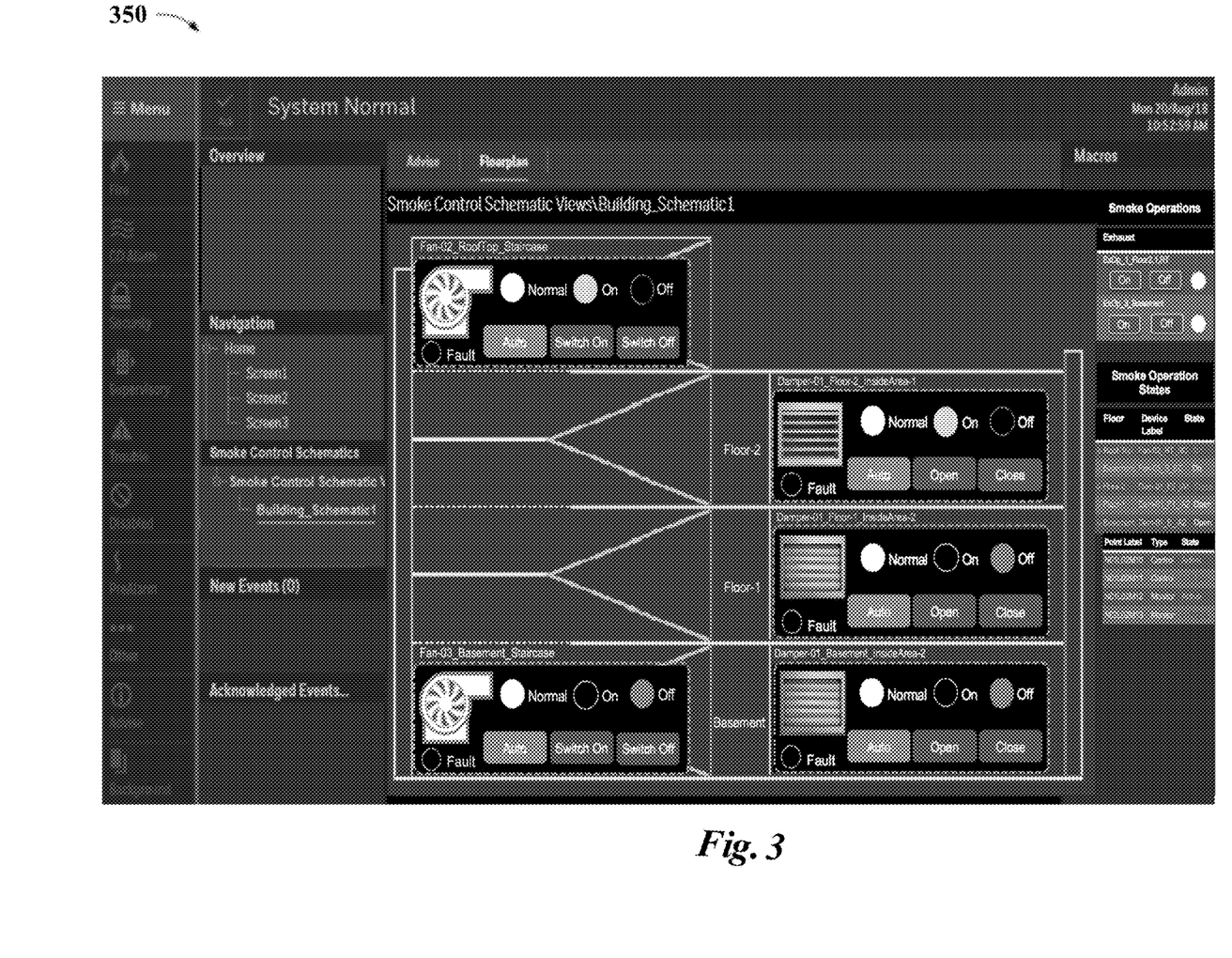
FIG. 3 illustrates an example of a display of smoke control elements and logic elements representing different components of a smoke control system of a facility and available smoke control operations, respectively, in accordance with an embodiment of the present disclosure.

FIG. 3 illustrates an example of a display 350 of available smoke control operations and smoke control elements representing different components of a smoke control system of a facility in accordance with an embodiment of the present disclosure. Display 350 can be displayed on a user interface, such as, for instance, user interface 116 of computing device 102 previously described in connection with FIG. 1, and the smoke control system of the facility can be analogous to the smoke control system of the facility previously described in connection with FIG. 1.

As shown in FIG. 3, the display 350 can include a schematic floor plan of the facility with various smoke control elements displayed therein. The position of each respective smoke control element within the display of the schematic floor plan can correspond to a location in the facility of the component represented by that smoke control element. In some embodiments, the user interface 116 can receive a selection of an action to be performed by all of the components of the smoke control system located on a particular floor of the facility via a position within the display of the schematic floor plan. For example, if the user wishes to turn off all of the fans on the first floor, they can make a selection of that action on a fan element located on the portion of the schematic floor plan representing a first floor of the facility. That fan element could represent all of the fans located on the first floor and hence cause all of the fans on the first floor to be turned off. Via a position within the display of the schematic floor plan, the user interface 116 can also receive a selection of a smoke control operation to be performed on a floor of the facility. For example, to initiate a "Pressurize" operation on the first floor, the user could select a "Pressurize" logic element located on the portion of the schematic floor plan representing the first floor of the facility.

As shown in FIG. 3, the display 350 can include a list of operational states of various components of the smoke control system. The list of operational states can be updated continuously as the operational states (e.g., the new operational states resulting from the components performing their respective actions) are determined, providing live feedback for the user. In some embodiments, the list of operational states can be arranged in a chronological order. For example, the most recently determined operational state can be displayed at the top of the list, while the least recently determined operational state can be displayed at the bottom of the list. In some embodiments, the user interface 116 can display the schematic floor plan of the facility on one screen and the list of operational states of the components on a second screen.

As described in connection with FIG. 1, an action to be performed by a component of the system can be communicated to a control module connected to that component. The control module can then cause the action to be performed by the component. Furthermore, operational states of components of the smoke control system can be determined based on data collected from components of the smoke control system by one or more sensors located throughout the facility. As used herein, the term "sensor" can be used to refer to a sensor, monitor, camera, or any other device which can collect data. In some embodiments, the user can connect components of the smoke control system to the sensors to be used in determining their operation states. As shown in FIG. 3, the display 350 can include a list of sensors (e.g., "Monitors") and control modules (e.g., "Controls") in the facility. This list can include indications of the location, type, and operation state of each sensor and control module. For example, if a sensor is currently configured to collect data from a smoke control component, the list could include an "Active" indicator on the line corresponding to that sensor. In some embodiments, the list of sensors and modules can include only the sensors and modules connected to the components involved in a smoke control operation being executed.

As described in accordance with FIG. 1, the user can select a smoke control operation to be performed using one or more components of the smoke control system. The user interface 116 can be configured to display a number of logic elements, wherein each element represents a smoke control operation (e.g., "Exhaust", "Purge", "Pressurize"). As used herein, the term "smoke control operation" can refer to a set of instructions specifying actions to be performed by various components of the smoke control system. An action to be performed by a component can be based the component's type and location within the facility. When an action of the smoke control operation is performed, the corresponding smoke control element of the user interface can perform a graphical animation based on the action, type of component, or both. In some embodiments, the graphical animation being performed can change based on a determined operation state of the corresponding component. For example, if the component represented by the smoke control element that performed the action is a fan, and the action is turning the fan on, the graphical animation can show the visual representation of that fan included in the smoke control element turning on. If the system subsequently determines that the operation state of the fan is "off", the graphical animation can show the visual representation of that fan included in the smoke control element turning off.

If a determined operational state of a component is inconsistent with the desired final operational state stored in the memory 112 pertaining to the component and operation, the visual representation of the component can include an indication of a fault associated therewith. Upon a component of the smoke control system having a fault associated therewith, the position of the smoke control element that represents that component within the display can be highlighted.

As shown in FIG. 3, the display 350 can include a display of multiple logic elements representing available smoke control operations. Floor operation elements (e.g. elements or indicators representing each floor) can be displayed beneath each item of the list of multi-component operations. Each floor operation element can include a selectable "On" icon and a selectable "Off" icon, along with an indication of an operation state. The indication of the operation state can, for instance, be a circle colored white when the operation is being performed on that floor and colored black when the operation is not being performed on that floor.

For example, if "Exhaust" is one of the available operations, it can be represented by a displayed logic element. One or more floor operation elements can be displayed beneath the "Exhaust" logic element, wherein each of the floor operation elements represents a different floor of the facility and includes a selectable "On" icon, a selectable "Off" icon, and an indication of an operation state. If a user wishes to perform the "Exhaust" operation on a certain floor, they can locate the floor operation element corresponding to the desired floor beneath the "Exhaust" logic element and select the "On" icon.

The success of the operation can be determined based on the operation state indicator. To terminate the "Exhaust" operation, the user can select the "Off" icon, which will terminate the operation. Whether or not the operation terminated successfully can be determined by the operation state indicator. In some embodiments, the operation state of the floor can be determined by comparing the operation states of the components involved in the operation to desired operation states pertaining to the smoke control operation.

In some embodiments, a graphical animation can be performed by each smoke control element representing a smoke control component involved in smoke control operation being performed. These animations can be performed simultaneously after the last action of the operation has been performed. These animations can also be performed individually after the performance of an action by their respective smoke control components. The graphical animation can be based on the type of action performed.

Embodiments of the present disclosure can also allow the user to perform graphical simulations of multi-component operations on the graphical user interface without causing any actions to be performed by the physical components of the smoke control system. In one embodiment, the graphical user interface can include a simulation schematic display. Such a display can be analogous to display 550 except that selections made by the user will not cause any actions to be performed by physical components of the smoke control system. Instead, only the graphical animations described above will be performed.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure. It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computing device for controlling and monitoring a smoke control system comprising:
   a user interface configured to:
   display a schematic floor plan of a facility;
   display a plurality of smoke control elements within the display of the schematic floor plan of the facility, wherein:
   each respective one of the displayed smoke control elements represents a different component of the smoke control system; and
   a position of each respective smoke control element within the display of the schematic floor plan of the facility corresponds to a location in the facility of the component represented by that smoke control element;

receive, via a position within the display of the schematic floor plan of the facility, a selection of an action to be performed by all of the components of the smoke control system located at the corresponding location of the facility; and a memory; and a processor configured to execute executable instructions stored in the memory to cause the selected action to be performed by all of the components of the smoke control system located at the corresponding location of the facility.

2. The computing device of claim 1, wherein the user interface is configured to display an operational state of all of the components of the smoke control system located at the corresponding location of the facility during the performance of the selected action.

3. The computing device of claim 2, wherein the user interface is configured to display the schematic floor plan of the facility on a first screen and display the operational state of the components on a second screen.

4. The computing device of claim 1, wherein the user interface is configured to receive, via the position within the display of the schematic floor plan of the facility, a selection of a smoke control operation to be performed at the corresponding location of the facility.

5. The computing device of claim 1, wherein the corresponding location of the facility is a particular floor of the facility.

6. The computing device of claim 1, wherein the selected action to be performed comprises turning off all fans of the smoke control system located at the corresponding location of the facility.

7. A method for controlling and monitoring a smoke control system, comprising:
   displaying, on a user interface of a computing device, a plurality of smoke control elements, wherein each respective one of the displayed smoke control elements represents a different component of the smoke control system;
   receiving, by the user interface, a selection to perform a smoke control operation, wherein:
      the selected smoke control operation includes a sequence of actions; and
      each action of the sequence of actions is to be performed by a different component of the smoke control system; and
   performing, by the different components of the smoke control system, each action of the sequence of actions.

8. The method of claim 7, wherein the method includes determining an operational state of the different components of the smoke control system during the performance of each action of the sequence of actions.

9. The method of claim 8, wherein the method includes displaying, on the user interface, a list comprising the determined operational states.

10. The method of claim 7, wherein the method includes configuring, by a user via the user interface, the sequence of actions.

11. The method of claim 7, wherein the method includes identifying, by a user via the user interface, a position of a fault in the sequence of actions.

12. The method of claim 7, wherein the sequence of actions is a pre-determined sequence of actions.

13. The method of claim 7, wherein the smoke control operation comprises at least one of:
   an exhausting operation;
   a purging operation; and
   a pressurizing operation.

14. A non-transitory computer readable medium having computer readable instructions stored thereon that are executable by a processor to:
   display, on a graphical user interface, a plurality of smoke control elements, wherein each respective one of the displayed smoke control elements represents a different component of a smoke control system;
   display, on the graphical user interface, a number of logic elements, wherein:
      each logic element represents a set of instructions;
      the set of instructions represented by each logic element includes instructions for each different component of the smoke control system to perform an action of a smoke control operation; and
      the action of the smoke control operation to be performed by each different component of the smoke control system is based on a type of that component;
   receive, via the graphical user interface, a selection of one of the number of logic elements; and
   cause each different component of the smoke control system to perform its action of the smoke control operation included in the set of instructions represented by the selected logic element.

15. The computer readable medium of claim 14, wherein the instructions are executable to display, on the graphical user interface, a graphical animation of a displayed smoke control element upon the component of the smoke control system represented by that smoke control element performing its action of the smoke control operation included in the set of instructions represented by the selected logic element.

16. The computer readable medium of claim 14, wherein the instructions are executable to store the type of each different component of the smoke control system in a memory.

17. The computer readable medium of claim 14, wherein the instructions are executable to receive, via the graphical user interface, a selection of a location on which to perform the smoke control operation.

18. The computer readable medium of claim 17, wherein the selection of the location comprises a selection of a floor operation element displayed on the graphical user interface.

19. The computer readable medium of claim 14, wherein:
   a first one of the logic elements represents a set of instructions for an exhaust smoke control operation;
   a second one of the logic elements represents a set of instructions for a purge smoke control operation; and
   a third one of the logic elements represents a set of instructions for a pressurize smoke control operation.

20. The computer readable medium of claim 14, wherein the instructions are executable to store a desired final operational state for each different component of the smoke control system in a memory, wherein the desired final operational state for each different component of the smoke control system is based on the type of that component.

* * * * *